(12) United States Patent
Lavoie et al.

(10) Patent No.: US 10,976,733 B2
(45) Date of Patent: Apr. 13, 2021

(54) INTERFACES FOR REMOTE TRAILER MANEUVER ASSIST

(71) Applicant: Ford Global Technologies, LLC, Dearborn, MI (US)

(72) Inventors: Erick Michael Lavoie, Dearborn, MI (US); John Robert Van Wiemeersch, Novi, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 16/142,995

(22) Filed: Sep. 26, 2018

(65) Prior Publication Data

US 2020/0097001 A1    Mar. 26, 2020

(51) Int. Cl.
| | |
|---|---|
| *G05D 1/00* | (2006.01) |
| *G06F 3/0481* | (2013.01) |
| *G06F 3/0488* | (2013.01) |
| *G06F 3/0484* | (2013.01) |
| *H04N 5/45* | (2011.01) |
| *G05D 1/02* | (2020.01) |
| *B60D 1/36* | (2006.01) |
| *G06F 3/01* | (2006.01) |

(Continued)

(52) U.S. Cl.
CPC .......... *G05D 1/0044* (2013.01); *B60D 1/36* (2013.01); *G05D 1/005* (2013.01); *G05D 1/0038* (2013.01); *G05D 1/0212* (2013.01); *G06F 3/04817* (2013.01); *G06F 3/04845* (2013.01); *G06F 3/04883* (2013.01); *H04N 5/45* (2013.01); *G05D 2201/0213* (2013.01); *G06F 3/016* (2013.01); *G06T 3/4038* (2013.01); *H04N 5/247* (2013.01)

(58) Field of Classification Search
CPC .................................................. G05D 1/0044
USPC ............................................................. 701/2
See application file for complete search history.

(56) References Cited

U.S. PATENT DOCUMENTS

| | | | |
|---|---|---|---|
| 6,806,809 B2 * | 10/2004 | Lee ........................ | B60D 1/58 280/419 |
| 7,164,117 B2 * | 1/2007 | Breed ................ | B60R 21/01516 250/208.1 |
| 9,233,710 B2 | 1/2016 | Lavoie et al. | |

(Continued)

FOREIGN PATENT DOCUMENTS

DE        102013016342 A1     4/2015

OTHER PUBLICATIONS

Leith Buick GMC, *Smart Trailer Parking (EN)*, retrieved from https://www.youtube.com/watch?v=iRkz51P4WUc Published Dec. 2013.

*Primary Examiner* — Jean Paul Cass
(74) *Attorney, Agent, or Firm* — Frank Lollo; Eversheds Sutherland (US) LLP

(57) ABSTRACT

Method and apparatus are disclosed for interfaces for remote trailer maneuver-assist. An example trailer maneuver-assist system includes a mobile device including a touchscreen to present an interface. The interface includes an icon for receiving a direction-of-travel and a track for receiving a continuous motion input. The example trailer maneuver-assist system also includes a vehicle. The vehicle includes a communication module for wireless communication with the mobile device and a local control unit that performs motive functions in the direction-of-travel while the mobile device receives the continuous motion input via the touchscreen.

19 Claims, 6 Drawing Sheets

(51) Int. Cl.
  *G06T 3/40* (2006.01)
  *H04N 5/247* (2006.01)

(56) References Cited

U.S. PATENT DOCUMENTS

| | | | |
|---|---|---|---|
| 9,513,631 B2 | 12/2016 | Boos et al. | |
| 9,554,084 B2* | 1/2017 | Lee | H04N 5/45 |
| 10,435,070 B2* | 10/2019 | Herzog | G06N 20/00 |
| 2005/0046584 A1* | 3/2005 | Breed | B60N 2/0232 |
| | | | 340/13.31 |
| 2005/0278098 A1* | 12/2005 | Breed | G01S 13/931 |
| | | | 701/45 |
| 2006/0182418 A1* | 8/2006 | Yamagata | G11B 27/329 |
| | | | 386/248 |
| 2006/0208169 A1* | 9/2006 | Breed | G06K 9/00624 |
| | | | 250/221 |
| 2008/0040004 A1* | 2/2008 | Breed | B60R 21/0134 |
| | | | 701/45 |
| 2008/0046150 A1* | 2/2008 | Breed | B60R 21/0134 |
| | | | 701/45 |
| 2009/0013363 A1* | 1/2009 | Lee | H04H 20/24 |
| | | | 725/110 |
| 2009/0049298 A1* | 2/2009 | Hatter | H04L 9/321 |
| | | | 713/176 |
| 2009/0327144 A1* | 12/2009 | Hatter | G06Q 20/40145 |
| | | | 705/75 |
| 2010/0305844 A1* | 12/2010 | Choi | G01C 21/3423 |
| | | | 701/533 |
| 2013/0218460 A1* | 8/2013 | Kim | G08G 1/09626 |
| | | | 701/461 |
| 2015/0061895 A1* | 3/2015 | Ricci | G06Q 10/20 |
| | | | 340/902 |
| 2016/0062354 A1 | 3/2016 | Li | |
| 2016/0096549 A1* | 4/2016 | Herzog | B62D 13/06 |
| | | | 701/41 |
| 2017/0225679 A1 | 8/2017 | Bonnet et al. | |
| 2018/0147900 A1* | 5/2018 | Shank | B60R 25/25 |
| 2018/0164817 A1* | 6/2018 | Herz | G05D 1/0212 |
| 2020/0118379 A1* | 4/2020 | Danielson | G07F 17/3211 |

* cited by examiner ating remote trailer maneuver-assist via a mobile app interface in accordance with the teachings herein.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions are semi-autonomously controlled by the vehicle. For example, some vehicles include cruise control features (e.g., adaptive cruise control features) in which the vehicle controls acceleration and/or deceleration of the vehicle so that a speed of the vehicle is maintained. Many vehicles also include features that may be controlled remotely.

For instance, remote parking features allow a user to control a vehicle remotely, via a mobile device, into and/or out of a parking spot. Remote trailer backup-assist features allow a user to monitor and guide a trailer hitched to a vehicle into a desired position from a remote location via a mobile device. In some instances, a remote park-assist system enables the user to exit the vehicle before the vehicle is parked in a small parking spot (e.g., from which the user may have difficulty exiting the cabin of the vehicle). Some remote trailer maneuver-assist systems include a mobile app that enables a user to control the motive functions of the vehicle from a remote location. In some instances, it potentially may be difficult for a user to accurately control various aspects (e.g., longitudinal direction of travel, turning radius, continuous movement, braking, etc.) of maneuvering a trailing from an interface of a mobile app.

Example methods and apparatus disclosed herein include a single user-friendly interface of a mobile app that enables

INTERFACES FOR REMOTE TRAILER MANEUVER ASSIST

TECHNICAL FIELD

The present disclosure generally relates to trailers and, more specifically, to interfaces for remote trailer maneuver-assist.

BACKGROUND

Many vehicles include functions in which at least some motive functions are semi-autonomously controlled by the vehicle. For example, some vehicles include cruise control features (e.g., adaptive cruise control features) in which the vehicle controls acceleration and/or deceleration of the vehicle so that a speed of the vehicle is maintained. Many vehicles also include features that may be controlled remotely. For instance, remote parking features allow a user to control a vehicle remotely, via a mobile device, into and/or out of a parking spot. Remote trailer backup-assist features allow a user to monitor and guide a trailer hitched to a vehicle into a desired position from a remote location via a mobile device.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for interfaces for remote trailer maneuver-assist. An example disclosed trailer maneuver-assist system includes a mobile device including a touchscreen to present an interface. The interface includes an icon for receiving a direction-of-travel and a track for receiving a continuous motion input. The example disclosed trailer maneuver-assist system also includes a vehicle. The vehicle includes a communication module for wireless communication with the mobile device and a local control unit that performs motive functions in the direction-of-travel while the mobile device receives the continuous motion input via the touchscreen.

An example disclosed remote trailer maneuver-assist system includes a vehicle that includes a hitch and a local control unit (LCU). The example disclosed remote trailer maneuver-assist system also includes a mobile app including an interface for a touchscreen of a mobile device. The interface includes an icon for receiving a direction-of-travel and a track for receiving a continuous motion input. The LCU performs motive functions in the direction-of-travel while the mobile app receives the continuous motion input via the touchscreen.

An example disclosed method includes receiving a direction-of-travel for a trailer maneuver-assist system from a user interacting with an icon of an interface presented by a mobile device, receiving a continuous motion input as the user interacts with a track of the interface, and communicating the direction-of-travel to a vehicle while the continuous motion input is received. The example disclosed method also includes performing, via a local control unit, vehicle motive functions in the direction-of-travel.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

a user to both select a direction of travel and initiate movement of a vehicle in the selected direction in an intuitive manner. Examples disclosed herein include a remote trailer maneuver-assist (ReTMA) system for a vehicle. A remote device presents an interface of a ReTMA mobile app to the user. The interface includes (1) a first icon (e.g., including a vehicle, a trailer, and a pin) that enables the user to control a direction of travel (e.g., forward/reverse, turning radius) with a first finger and (2) a second icon (e.g., a continuous track) that enables the user to (i) initiate movement via continuous input and (ii) control a speed of travel with another finger. The first icon and the second icon are configured to be utilized simultaneously by the user. In some examples, the interface may enable the user to change the selected speed and/or direction of travel by pressing harder on a touchscreen of the remote device. In some examples, the interface enables the user to change the selected longitudinal direction of travel (e.g., forward/reverse) via the first icon only when the vehicle is in a stopped state. In some examples, the mobile app presents images of a surrounding area captured by a camera of the vehicle after the vehicle has been in a paused state for a predetermined period of time.

As used herein, "trailer maneuver-assist" refers to a system in which a user controls motive functions of a vehicle while a trailer is coupled to the vehicle to enable the vehicle to guide the trailer into a desired position (e.g., identified via user input). As used herein, "remote trailer maneuver-assist" refers to a trailer maneuver-assist system that enables a user to controls motive functions of a vehicle from a remote location (e.g., via a mobile device) relative to the vehicle. As used herein, an "app" and a "mobile app" refer to a computer program and/or software that is configured to operate on a mobile device (e.g., a smart phone, a key fob, a smart watch, a wearable, a tablet, etc.).

Figure 1:
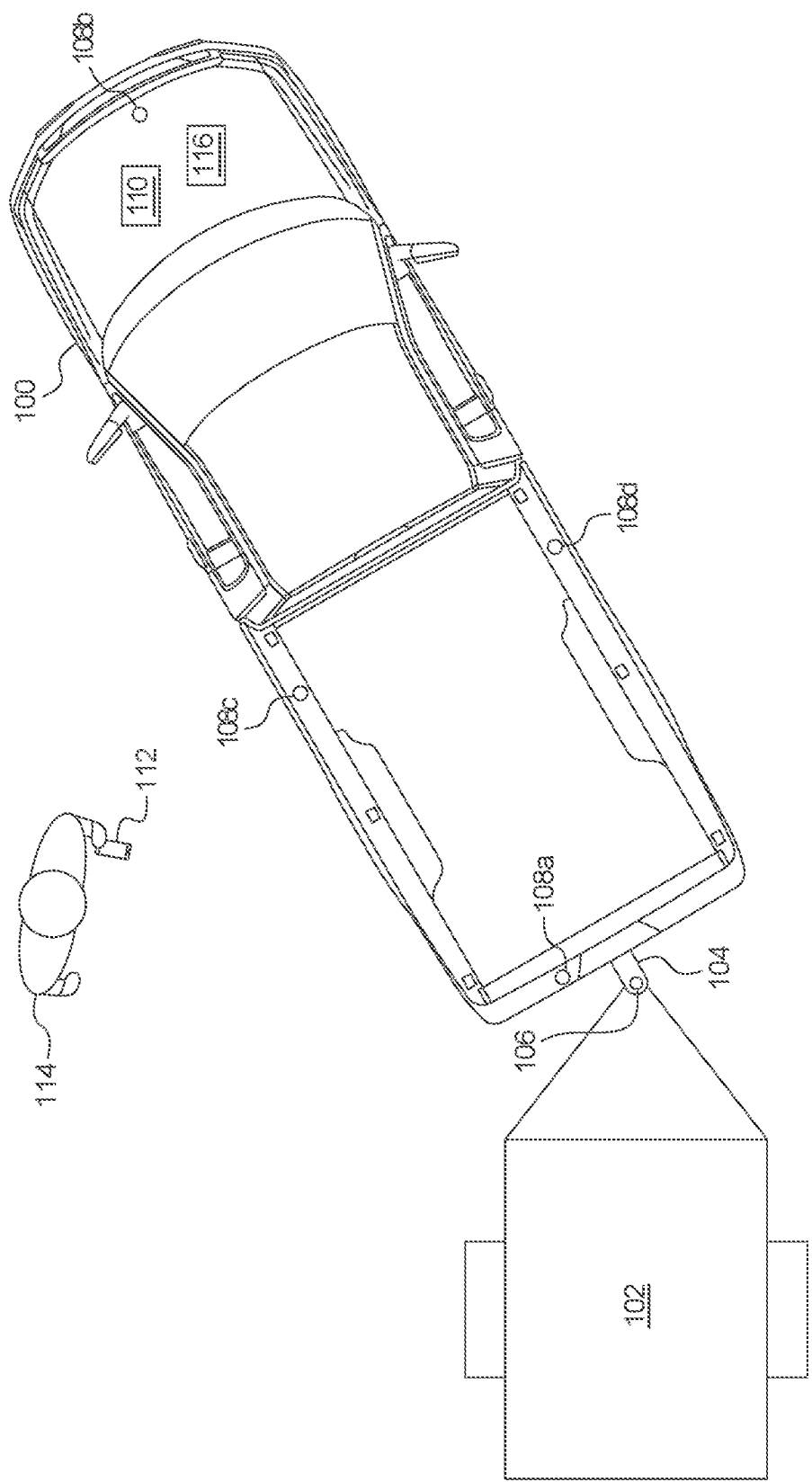
FIG. 1 illustrates an example vehicle and an example trailer in accordance with the teachings herein.

Turning to the figures, FIG. 1 illustrates an example vehicle 100 in accordance with the teachings herein. The vehicle 100 (e.g., a pickup truck, a tow truck, etc.) may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

Further, a trailer 102 is coupled to the vehicle 100 via a hitch 104 of the vehicle 100. As used herein, a "trailer" refers to an object (e.g., a travel trailer, a recreational vehicle, a disabled vehicle, a mobile home, etc.) that is being towed by the vehicle 100. In the illustrated example, the trailer 102 is coupled to the vehicle 100 via the hitch 104 to facilitation in the transportation of object(s) from one location to another location. For example, the trailer 102 is utilized to transport object(s) when storage areas within the vehicle 100 (e.g., trunks, flatbeds, back seats, etc.) are unable to contain to those object(s). The hitch 104 (also referred to as a tow hitch, a tow bar, a trailer hitch, etc.) of the illustrated example is located towards the rear of the vehicle 100. For example, the hitch 104 is coupled to and/or extends from a chassis of the vehicle 100. The hitch 104 is configured to receive a trailer connector of the trailer 102 to couple the trailer 102 to the vehicle 100. In other words, the hitch 104 enables the vehicle 100 to tow the trailer 102.

In the illustrated example, the vehicle 100 includes a hitch sensor 106 to monitor the position of the trailer 102 relative to the hitch 104 of the vehicle 100. For example, the hitch sensor 106 detects when the trailer 102 is coupled to the hitch 104 of the vehicle 100. In such examples, the hitch sensor 106 may be a capacitive sensor, a piezoelectric sensor, a magnetoelastic sensor, and/or any other sensor configured to detect a coupling of the trailer 102 to the hitch 104. Additionally, or alternatively, the hitch sensor 106 detects an angle formed between the trailer 102 and the vehicle 100 when the trailer 102 is coupled to the hitch 104 (also referred to as a hitch angle and an actual angle).

The vehicle 100 of the illustrated example also includes cameras 108 (also referred to as exterior cameras) configured to capture image(s) and/or video of a surrounding area of the vehicle 100. For example, a camera 108a captures image(s) and/or video of an area behind the vehicle 100, a camera 108b captures image(s) and/or video of an area in front of the vehicle 100, a camera 108c captures image(s) and/or video of an area to the left of the vehicle 100, and a camera 108d captures image(s) and/or video of an area to the right of the vehicle 100.

In some examples, the image(s) and/or video captured by the cameras 108 are utilized to facilitate in the performance of autonomous and/or semi-autonomous motive functions. For example, the image(s) and/or video are analyzed to detect a presence of, a relative location of, and/or a distance to object(s) near the vehicle 100. In turn, the vehicle 100 performs the autonomous and/or semi-autonomous motive functions to avoid contacting the nearby object(s) identified within the image(s) and/or video captured by the cameras 108.

Further, in some examples, the camera 108a is positioned near the hitch 104 of the vehicle 100 and is utilized to monitor the trailer 102. For example, the image(s) and/or video captured by the camera 108a are utilized to determine whether the trailer 102 is coupled to the hitch 104 and/or a hitch angle between trailer 102 and the vehicle 100.

Additionally, or alternatively, the image(s) and/or video captured by the cameras 108 are stitched together (e.g., by a camera module 716 of FIG. 7) into an overhead image (also referred to as a bird's-eye view) of the vehicle 100 and the area surrounding the vehicle 100. For example, the camera module utilizes image stitching software to identify object(s) within each of the collected images, match object(s) that are within a plurality of the collected images, calibrate the collected images with respect to each other, blend the calibrated images together to form the overhead image, and overlay an outline of the vehicle 100 onto the overhead image.

The vehicle 100 of the illustrated example also includes a communication module 110. For example, the communication module 110 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 110 also includes hardware (e.g., processors, memory, storage, antenna, etc.) and software to control the wired or wireless network interfaces. For example, the communication module 110 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the communication module 110 includes hardware and firmware to establish a wireless connection with mobile device 112 (e.g., a smart phone, a key fob, a wearable, a smart watch, a tablet, etc.) of a user 114 (e.g., an operator such as a driver) of the vehicle 100. For example, the communication module 110 is a wireless personal area network (WPAN) module that wirelessly communicates with key fob(s) and/or mobile device(s) of user(s) (e.g., the mobile device 112 of the user 114) via short-range wireless communication protocol(s). In some examples, the communication module 110 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally, or alternatively, the communication module 110 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 110 to communicatively couple to the mobile device 112 of the user 114.

The vehicle 100 also includes a local control unit 116 (also referred to as an LCU) that performs driving maneuvers for the vehicle 100 based on instructions provided remotely by the user 114 via the mobile device 112. In the illustrated example, the local control unit 116 performs motive functions for a trailer maneuver-assist system of the vehicle 100. For example, the local control unit 116 is configured to perform a motive function in a direction-of-travel that was selected by the user 114 via a mobile app (e.g., an app 608 of FIG. 6) operating on the mobile device 112 as the mobile app receives a continuous motion input from the user 114 via a touchscreen (e.g., a touchscreen 202 of FIGS. 2-6) of the mobile device 112. Further, in some examples, the local control unit 116 autonomously adjusts motive functions of the vehicle 100 based upon video captured by the cameras 108 and/or data collected by proximity sensors (e.g., proximity sensors 714 of FIG. 7) to avoid collisions with nearby objects.

Figure 3:
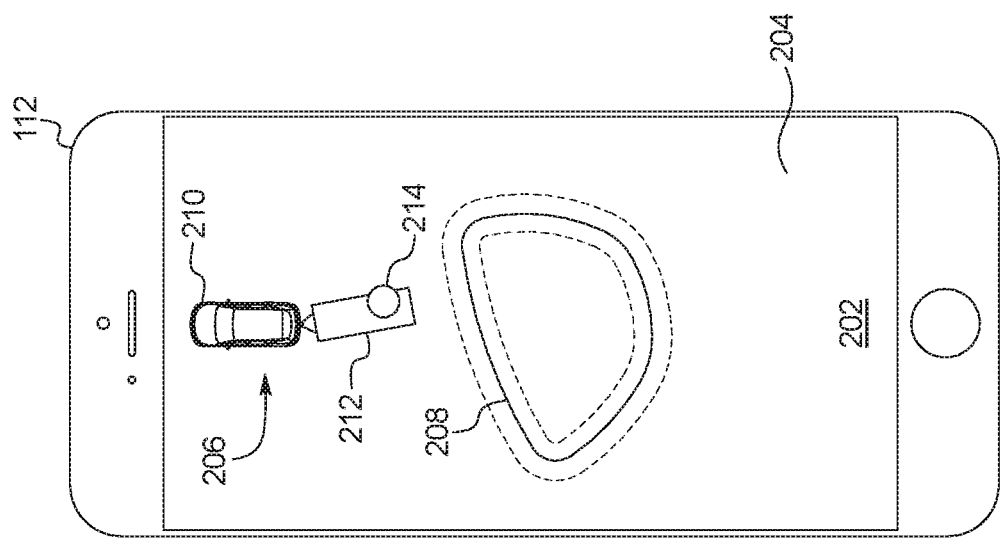
FIG. 3 further depicts the trailer maneuver-assist interface of FIG. 2.
Figure 2:
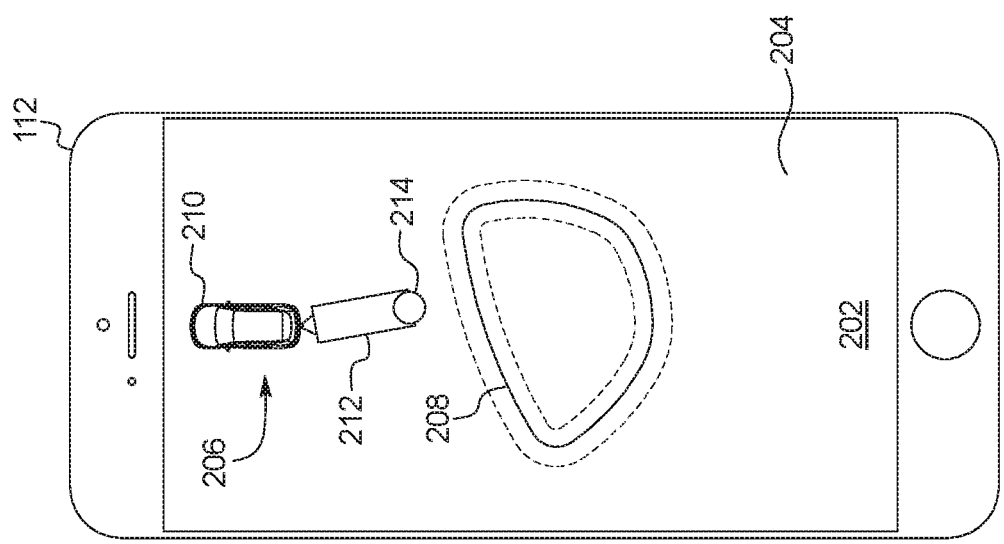
FIG. 2 depicts an example trailer maneuver-assist interface of a mobile device in accordance with the teachings herein.
Figure 4:
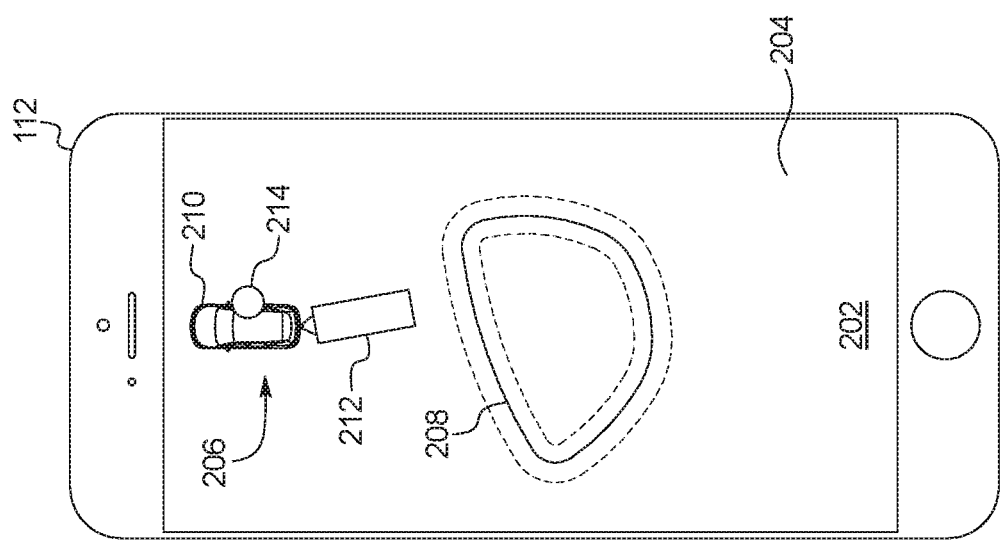
FIG. 4 further depicts the trailer maneuver-assist interface of FIG. 2.
Figure 5:
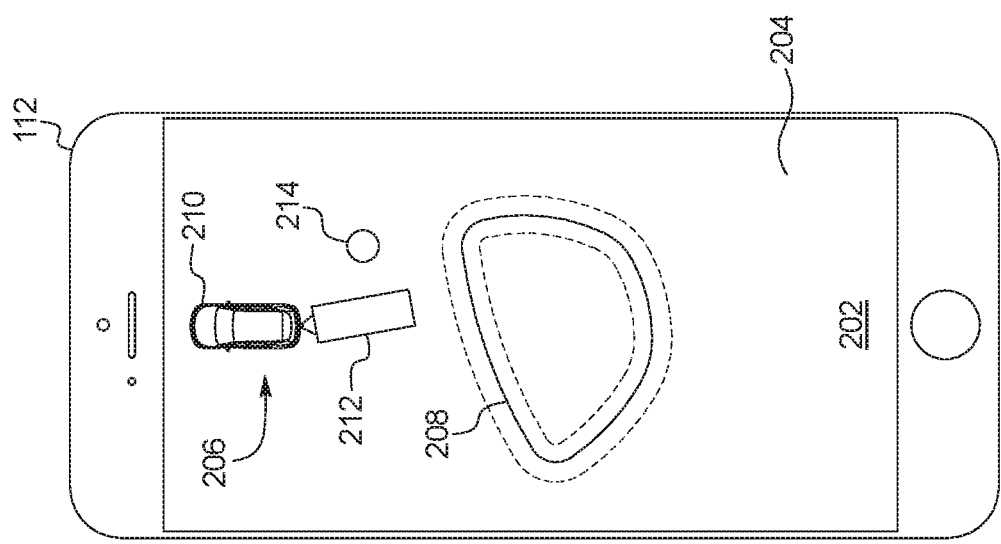
FIG. 5 further depicts the trailer maneuver-assist interface of FIG. 2.

FIGS. 2-5 depict a touchscreen 202 of the mobile device 112 presenting an interface 204 of a mobile app (e.g., an app 608 of FIG. 6) of a remote trailer maneuver-assist (ReTMA) system for the vehicle 100. More specifically, FIG. 2 depicts the interface 204 in a first state, FIG. 3 depicts the interface 204 in a second state, FIG. 4 depicts the interface 204 in a third state, and FIG. 5 depicts the interface 204 in a fourth state.

As illustrated in FIG. 2, the interface 204 of the mobile app that is presented via the touchscreen 202 of the mobile device 112 includes an icon 206 and a track 208. The icon 206 is configured to receive a direction-of-travel from the user 114. The track 208 is continuous (e.g., a circle, an oval, etc.) and configured to receive a continuous motion input from the user 114. The interface 204 of the illustrated example is configured to simultaneously receive the direction-of-travel via the icon 206 and the continuous motion input via the track 208 from the user 114. For example, the interface 204 of the mobile app enables the user 114 to simultaneously provide (1) the direction-of-travel by interacting with the icon 206 with one hand and (2) the continuous motion input by interacting with the track 208 with the other hand.

In the illustrated example, the icon 206 includes a vehicle icon 210, a trailer icon 212, and a pin 214. The interface 204 enables the user 114 to position the pin 214 relative to the vehicle icon 210 and the trailer icon 212. To position the pin 214 on the interface 204, the user 114 is to drag the pin 214 across the interface 204 and/or drop the pin 214 in place by tapping a location of interface 204. For example, the mobile app enables the user 114 to position the pin 214 by dragging his or her finger and/or a stylus across the touchscreen 202 of the mobile device 112. That is, the touchscreen 202 of the mobile device 112 is configured to (1) display the interface 204 of the mobile app and (2) receive input(s) from the user 114 for the mobile app.

Further, the track 208 is configured to receive a continuous motion input as the user 114 drags his or her finger and/or a stylus across portions of the touchscreen 202 that correspond with the track 208 of the interface 204. For example, the track 208 stops receiving a continuous motion input if the user 114 (1) lifts his or her finger and/or a stylus from the touchscreen 202 and/or (2) drags his or her finger and/or a stylus to a portion of the touchscreen 202 that does not correspond with the track 208.

In the illustrated example, the position of the pin 214 relative to the vehicle icon 210 and the trailer icon 212 affects the motive functions performed by the local control unit 116 of the vehicle 100. For example, the user 114 is to position the pin 214 on the vehicle icon 210 to instruct the local control unit 116 to perform a forward driving motion. Conversely, the user 114 is to position the pin 214 on the trailer icon 212 to instruct the local control unit 116 to perform a reverse driving motion. Further, the user 114 is to offset the pin 214 to the right to instruct the local control unit 116 to turn the vehicle 100 in a rightward direction. Conversely, the user 114 is to offset the pin 214 to the left to instruct the local control unit 116 to turn the vehicle 100 in a leftward direction.

In operation, the mobile device 112 instructs the local control unit 116 to perform motive functions in a selected direction-of-travel while the track 208 receives a continuous motion input from the user 114. That is, the mobile device 112 communicates the direction-of-travel selected by the user 114 to the local control unit 116 (e.g., via a communication module 606 of FIG. 6 and the communication module 110 of FIGS. 1 and 7) while the continuous motion input is received from the user 114. For example, the local control unit 116 drives the vehicle 100 in a forward direction when the pin 214 is positioned on the vehicle icon 210 while the track 208 receives a continuous motion input from the user 114. Conversely, the local control unit 116 drives the vehicle 100 in a reverse direction when the pin 214 is positioned on the trailer icon 212 while the track 208 receives a continuous motion input from the user 114. Additionally, or alternatively, the local control unit 116 performs a rightward turn when the pin 214 is offset to right while the track 208 receives a continuous motion input from the user 114. Conversely, the local control unit 116 performs a leftward turn when the pin 214 is offset to left while the track 208 receives a continuous motion input from the user 114. Further, the mobile device 112 instructs the local control unit 116 to not perform motive functions when the track 208 is not receiving a continuous motion input from the user 114.

In some examples, the mobile app of the ReTMA system enables the user 114 to control a speed at which the vehicle 100 is travelling via the continuous motion input. For example, the local control unit 116 causes the vehicle 100 to travel at a speed that corresponds with a speed that the user 114 provides the continuous motion input along the track 208. That is, the local control unit 116 causes the vehicle 100 to travel at faster speeds when the user 114 provides the continuous motion input at faster speeds. Conversely, the local control unit 116 causes the vehicle 100 to travel at slower speeds when the user 114 provides the continuous motion input at slower speeds. Similarly, the vehicle 100 accelerates when the continuous motion input accelerates, and the vehicle 100 decelerates when the continuous motion input decelerates.

Additionally, or alternatively, the interface 204 of the illustrated example is configured to corresponds with the position of the trailer 102 relative to the vehicle 100 (e.g., as detected by the hitch sensor 106). For example, to facilitate the user 114 in intuitively controlling the vehicle 100 via the mobile device 112, an angle formed between the vehicle icon 210 and the trailer icon 212 within the interface 204 matches the actual angle formed between the vehicle 100 and the trailer 102.

FIG. 3 further depicts an example of the interface 204 of the mobile app of the ReTMA system. In the illustrated example, the mobile app is configured to instruct the local control unit 116 to turn the vehicle 100 as long as the interface 204 continues to hold the pin 214 in place. If the user 114 releases his or her hand and/or a stylus from the touchscreen 202, the mobile app instructs the local control unit 116 to straighten out (i.e., to stop turning) the vehicle 100. That is, the mobile app is configured to instruct the local control unit 116 to continue to turn the vehicle 100 while the user 114 continues to hold the pin 214 at an offset position on trailer icon 212 of the interface 204. Further, the mobile app is configured to instruct the local control unit 116 to straighten out the vehicle 100 in response to detecting, via the touchscreen 202, that the user 114 has released the pin 214 of the interface 204.

In the illustrated example, the user 114 is holding the pin 214 in an offset position to the right relative to the trailer icon 212. In turn, while the user 114 simultaneously holds the pin 214 in place and provides a continuous motion input via the track 208, the mobile app instructs the local control unit 116 to turn the vehicle 100 in a rightward direction while travelling in reverse. If the user 114 releases the pin 214 while continuing to provide the continuous motion input, the mobile app instructs the local control unit 116 to straighten out the vehicle 100 while travelling in reverse. If the user 114 stops providing the continuous motion input, the mobile app instructs the local control unit 116 to stop performing motive functions of the vehicle 100.

Further, in some examples, the mobile app is configured to adjust a turning radius of the vehicle 100 based on a pressure that the user 114 applies to the touchscreen 202. For example, when the mobile app identifies (e.g., via pressure sensors 610 of FIG. 6) that the user 114 is pressing the pin 214 with increased pressure, the mobile app instructs the local control unit 116 to turn at a reduced turning radius. Conversely, when the mobile app identifies that the user 114 is pressing the pin 214 with reduced pressure, the mobile app instructs the local control unit 116 to turn at an increased turning radius.

FIG. 4 further depicts another example of the interface 204 of the mobile app of the ReTMA system. In the illustrated example, the mobile app is configured to instruct the local control unit 116 to continue to turn the vehicle 100 until a portion (e.g., a center portion) of the vehicle icon 210 and/or the trailer icon 212 reaches the position at which the user 114 has placed the pin 214 on the interface 204. In the illustrated example, the user 114 has placed the pin 214 to the right of the trailer icon 212. In some examples, the positions of the interface 204 at which the pin 214 may be placed by the user 114 are limited based on the minimum turning radius of the vehicle 100. After the user 114 has placed the pin 214 on the interface 204, the user 114 may release his or her hand and/or a stylus from the pin 214. The mobile app is configured to continue to instruct the local control unit 116 to turn the vehicle 100 until the vehicle icon 210 and/or the trailer icon 212 reaches the pin 214 on the interface 204. In the illustrated example, the mobile app continues to instruct the local control unit 116 to turn in a rightward direction while travelling in reverse until the trailer icon 212 reaches the pin 214. In such examples, the user 114 places the pin 214 at a central location to cause the mobile app to instruct the local control unit 116 to straighten out the vehicle 100.

FIG. 5 depicts the interface 204 when the pin 214 is placed on the vehicle icon 210. In such examples, the mobile app instructs the local control unit 116 to drive the vehicle 100 in a forward motion while the track 208 receives the continuous motion input. In some examples, the mobile app prevents the user 114 from changing the longitudinal direction of the direction-of-travel via the pin 214 while the vehicle 100 is moving. That is, the mobile app prevents the user 114 from transitioning the pin 214 between the vehicle icon 210 and the trailer icon 212 while the track 208 is receiving the continuous motion input from the user 114. In such examples, the mobile app enables the user 114 to change the longitudinal direction (e.g., forward, reverse) of the direction-of-travel of the vehicle 100 by transitioning the pin 214 between the vehicle icon 210 and the trailer icon 212 in response to detecting that the vehicle 100 is in a stopped state (i.e., the vehicle 100 is stationary). Additionally, or alternatively, the mobile app is configured to enable the user 114 to transition the pin 214 between the vehicle icon 210 and the trailer icon 212 to change the longitudinal direction of the direction-of-travel of the vehicle 100 upon detecting (via the pressure sensors 610) that the user 114 has increased a pressure applied to the touchscreen 202. That is, the mobile app enables the user 114 to transition the pin 214 between the vehicle icon 210 and the trailer icon 212 upon detecting that the user 114 has increased a pressure applied to a portion of the touchscreen 202 that corresponds with the pin 214.

Figure 7:
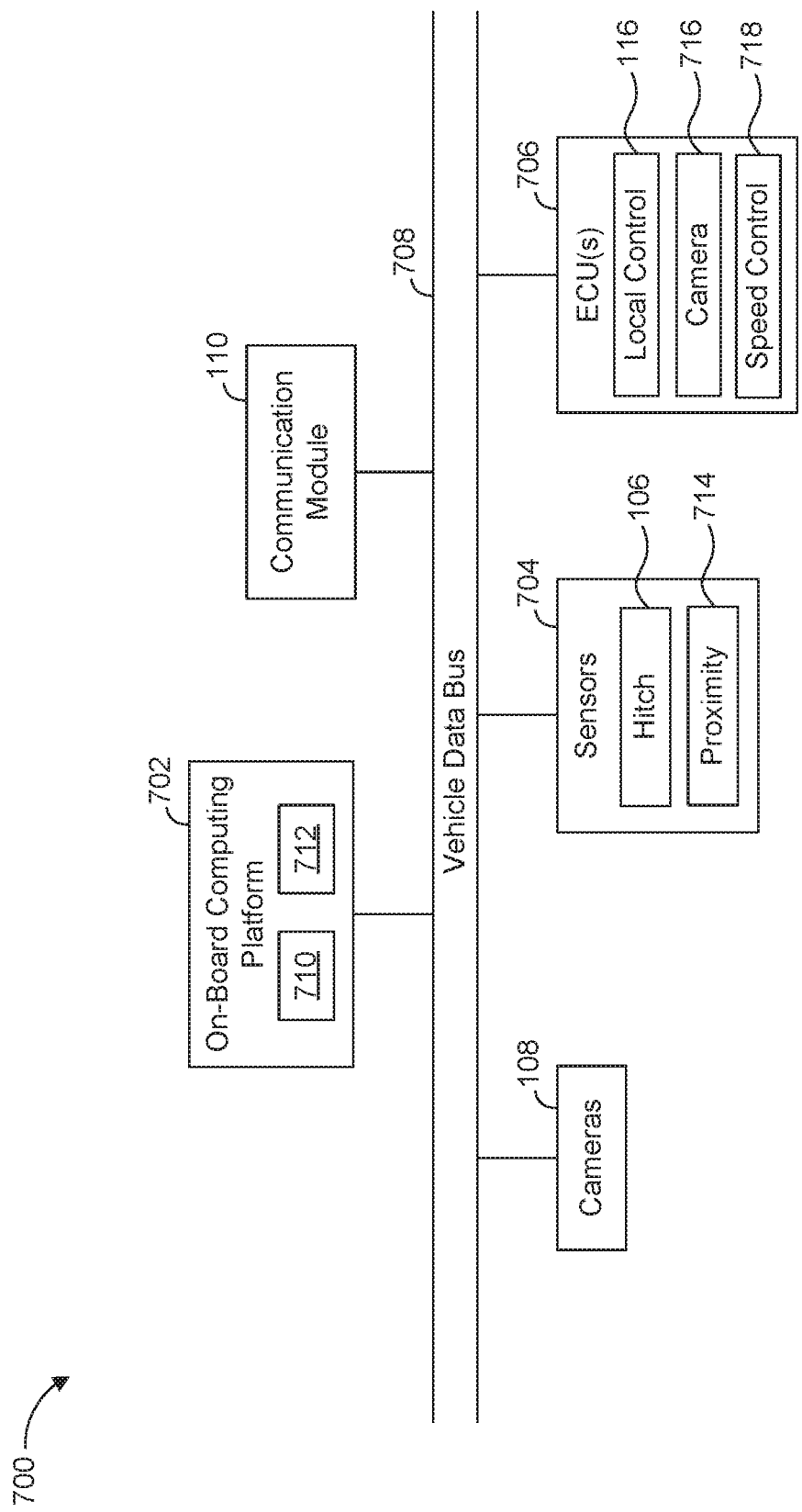
FIG. 7 is a block diagram of electronic components of the vehicle of FIG. 1.

In other examples, the mobile app wirelessly relays the input(s) received from the user 114 to a controller of the vehicle 100 (e.g., a controller 710 of FIG. 7). In such examples, the controller of the vehicle 100 is configured to determine whether to instruct the local control unit 116 to perform motive function(s) of the vehicle 100 based on the input(s) received from the mobile app. Further, the controller of the vehicle 100 is configured to instruct the local control unit 116 to perform motive function(s) based on the relayed input(s).

Figure 6:
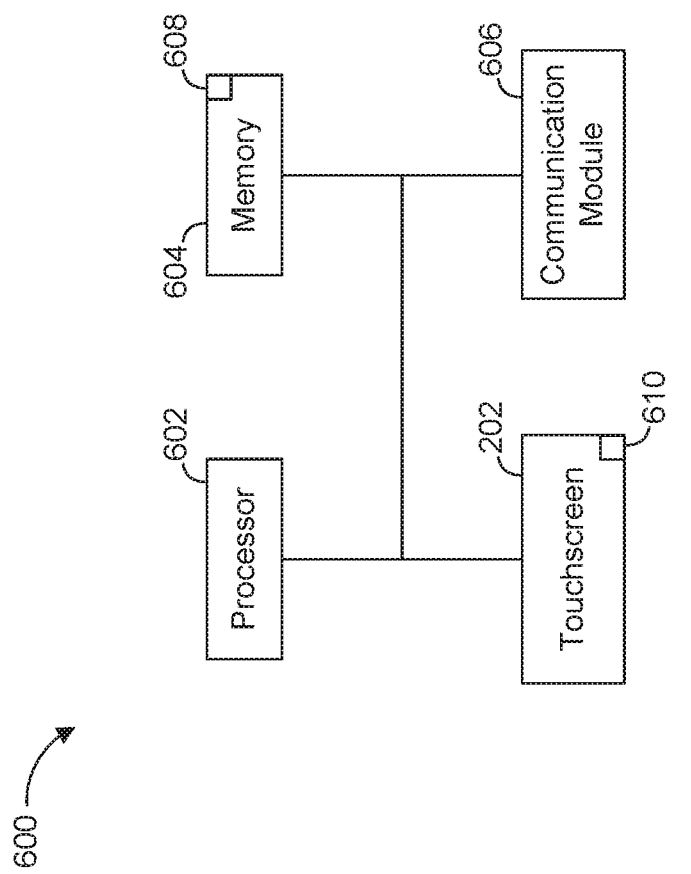
FIG. 6 is a block diagram of electronic components of the mobile device of FIG. 2.

FIG. 6 is a block diagram of electronic components 600 of the mobile device 112. As illustrated in FIG. 6, the electronic components 600 include a processor 602, memory 604, the touchscreen 202, and a communication module 606.

In the illustrated example, the processor 602 (also referred to as a microcontroller unit and a controller) may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 604 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 604 includes multiple kinds of memory, particularly volatile memory and non-volatile memory.

The memory 604 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 604, the computer readable medium, and/or within the processor 602 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, an app 608 (also referred to as mobile app) is a computer program and/or software that is configured to operate on the mobile device 112. The app 608 is stored in the memory 604 and configured to be executed by the processor 602. During operation, the app 608 presents interface(s) (e.g., the interface 204 of FIGS. 2-5) to and receives input(s) from the user 114 to enable the user 114 to control the motive functions of the vehicle 100 from a remote location.

The touchscreen 202 of the illustrated example provides an interface between the user 114 and the mobile device 112 to enable the user 114 to initiate the remote trailer maneuver-assist system of the vehicle 100. For example, the touchscreen 202 presents the interface 204 of the app 608 to the user 114 and receives input from the user 114 that corresponds with the interface 204. Based on input received from the user 114 via the touchscreen 202, the app 608 initiates motive functions of the vehicle 100 for remote trailer maneuver-assist.

The touchscreen 202 is a resistive touchscreen, a capacitive touchscreen, and/or any other type of touchscreen that displays output information to and tactilely receives input information from the user 114 of the mobile device 112. In the illustrated example, the touchscreen 202 includes pressure sensors 610 that enable the touchscreen 202 to receive an input from the user 114 by monitoring how hard the user 114 presses on the touchscreen 202. For example, the touchscreen 202 receives an input from the user 114 in response to detecting that the user 114 has applied a force to the touchscreen 202 that exceeds a predetermined threshold. Further, in some examples, the mobile device 112 also includes other input devices (e.g., buttons, knobs, microphones, etc.) and/or output devices (e.g., speakers, LEDs, etc.) to receive input information from and/or provide output information to the user 114 of the mobile device 112.

The communication module 606 of the mobile device 112 wirelessly communicates with the communication module 110 of the vehicle 100 to enable the app 608 to initiate motive functions of the vehicle 100 for the trailer maneuver-assist system. The communication module 606 includes wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 606 also includes hardware (e.g., processors, memory, storage, antenna, etc.) and software to control the wireless network interfaces. For example, the communication module 606 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the communication module 606 includes a wireless personal area network (WPAN) module that is configured to wirelessly communicate with the communication module 110 of the vehicle 100 via short-range wireless communication protocol(s). In some examples, the communication module 606 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally, or alternatively, the communication module 110 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 606 to communicatively couple to the communication module 110 of the vehicle 100.

FIG. 7 is a block diagram of electronic components 700 of the vehicle 100. As illustrated in FIG. 7, the electronic components 700 include an on-board computing platform 702, the communication module 110, the cameras 108, sensors 704, electronic control units (ECUs) 706, and a vehicle data bus 708.

The on-board computing platform 702 includes a processor 710 (also referred to as a microcontroller unit and a controller) and memory 712. The processor 710 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 712 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 712 includes multiple kinds of memory, particularly volatile memory and non-volatile memory.

The memory 712 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 712, the computer readable medium, and/or within the processor 710 during execution of the instructions.

The sensors 704 are arranged in and/or around the vehicle 100 to monitor properties of the vehicle 100 and/or an environment in which the vehicle 100 is located. One or more of the sensors 704 may be mounted to measure properties around an exterior of the vehicle 100. Additionally, or alternatively, one or more of the sensors 704 may be mounted inside a cabin of the vehicle 100 or in a body of the vehicle 100 (e.g., an engine compartment, wheel wells, etc.) to measure properties in an interior of the vehicle 100. For example, the sensors 704 include accelerometers, odometers, tachometers, pitch and yaw sensors, wheel speed sensors, tire pressure sensors, biometric sensors and/or sensors of any other suitable type.

In the illustrated example, the sensors 704 include the hitch sensor 106 and one or more proximity sensors 714. For example, the hitch sensor 106 detects whether the trailer 102 is coupled to the hitch 104 and/or a hitch angle between trailer 102 and the vehicle 100. The proximity sensors 714 are configured to detect a presence of, a relative location of, and/or a distance to object(s) near the vehicle 100. For example, the proximity sensors 714 monitor object(s) near the vehicle 100 to facilitate the vehicle 100 in avoiding the nearby object(s) while performing autonomous and/or semi-autonomous motive functions for the trailer maneuver-assist system. The proximity sensors 714 include radar sensor(s), lidar sensor(s), ultrasonic sensor(s), and/or any other sensor(s) configured to detect a presence of, a relative location of, and/or a distance of nearby object(s). For example, a radar sensor detects and locates an object via radio waves, a lidar sensor detects and locates the object via lasers, and an ultrasonic sensor detects and locates the object via ultrasound waves.

The ECUs 706 monitor and control the subsystems of the vehicle 100. For example, the ECUs 706 are discrete sets of electronics that include their own circuit(s) (e.g., integrated circuits, microprocessors, memory, storage, etc.) and firmware, sensors, actuators, and/or mounting hardware. The ECUs 706 communicate and exchange information via a vehicle data bus (e.g., the vehicle data bus 708). Additionally, the ECUs 706 may communicate properties (e.g., status of the ECUs 706, sensor readings, control state, error and diagnostic codes, etc.) to and/or receive requests from each other. For example, the vehicle 100 may have dozens of the ECUs 706 that are positioned in various locations around the vehicle 100 and are communicatively coupled by the vehicle data bus 708.

In the illustrated example, the ECUs 706 include the local control unit 116, a camera module 716, and a speed control unit 718. The local control unit 116 performs driving maneuvers of the vehicle 100 based upon, at least in part, remote instructions provided by the user 114 via the mobile device 112. The camera module 716 controls the cameras 108 for collecting image(s) and/or video, processes the collected image(s) and/or video, and/or stitches the collected image(s) and/or video together to form a bird's-eye view. Further, the speed control unit 718 autonomously controls a speed at which the vehicle 100 travels (e.g., during autonomous and/or semi-autonomous driving maneuvers).

The vehicle data bus 708 communicatively couples the cameras 108, the communication module 110, the on-board computing platform 702, the sensors 704, and the ECUs 706. In some examples, the vehicle data bus 708 includes one or more data buses. The vehicle data bus 708 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 8:
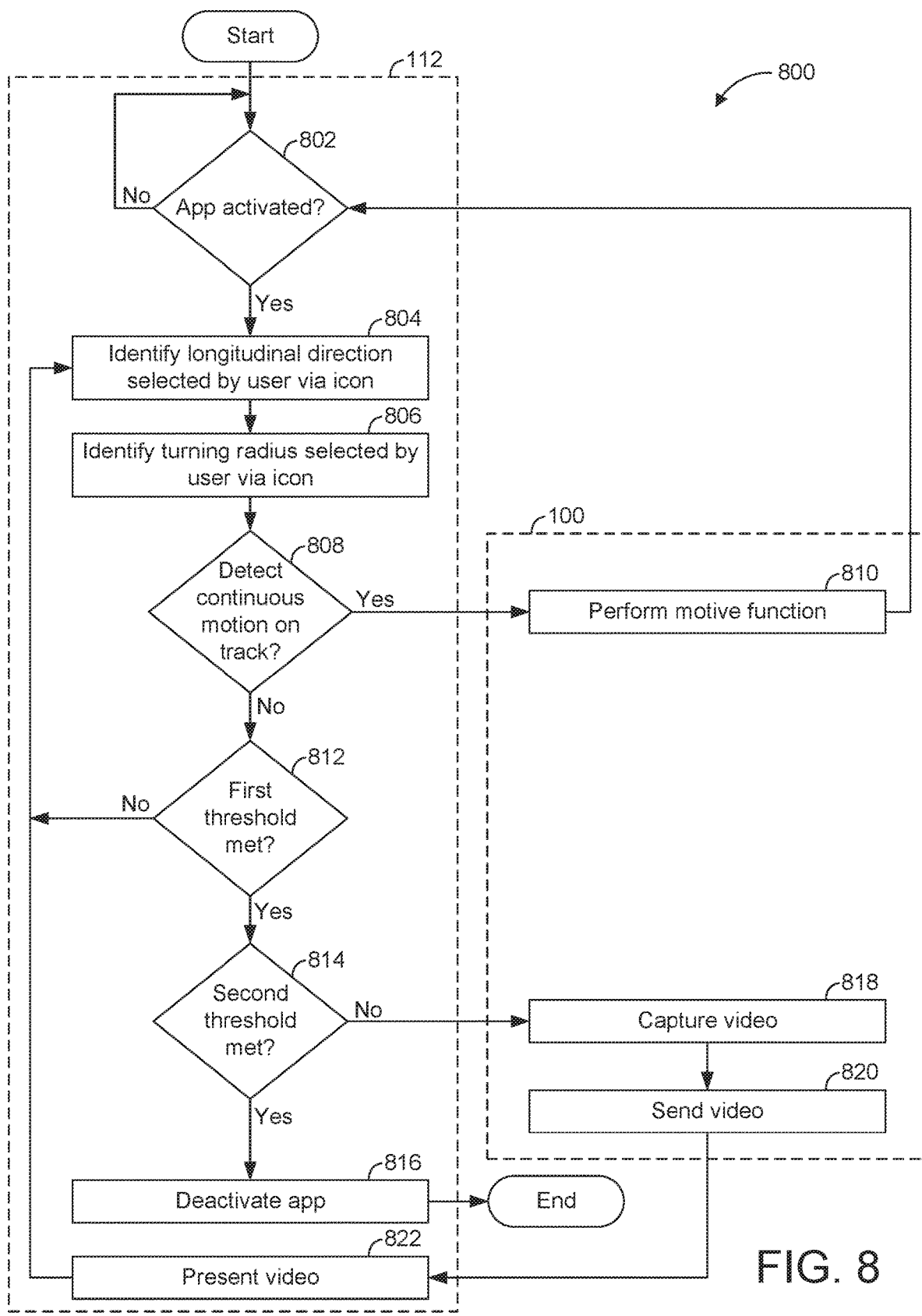
FIG. 8 is a flowchart for initiating remote trailer maneuver-assist via a mobile app interface in accordance with the teachings herein.

FIG. 8 is a flowchart of an example method 800 to initiate remote trailer maneuver-assist via a mobile app interface. The flowchart of FIG. 8 is representative of machine readable instructions that are stored in memory (such as the memory 604 of FIG. 6 and/or the memory 712 of FIG. 7) and include one or more programs which, when executed by a processor (such as the processor 602 of FIG. 6 and/or the processor 710 of FIG. 7), cause the vehicle 100 to implement the example app 608 of FIG. 6. While the example program is described with reference to the flowchart illustrated in FIG. 8, many other methods of implementing the example app 608 may alternatively be used. For example, the order of execution of the blocks may be rearranged, changed, eliminated, and/or combined to perform the method 800. Further, because the method 800 is disclosed in connection with the components of FIGS. 1-7, some functions of those components will not be described in detail below.

Initially, at block 802, the processor 602 of the mobile device 112 determines whether the app 608 is activated. In response to the processor 602 determining that the app 608 is not active, the method 800 remains at block 802. Otherwise, in response to the processor 602 determining that the app 608 is active, the method 800 proceeds to block 804 at which the app 608 identifies, via the touchscreen 202 of the mobile device 112, a longitudinal direction-of-travel that the user 114 selected by interacting with the icon 206 of the interface 204. That is, the app 608 determines whether the user 114 has selected a forward direction-of-travel or a reverse direction-of-travel. At block 806, the app 608 identifies, via the touchscreen 202 of the mobile device 112, a latitudinal direction-of-travel that the user 114 selected by interacting with the icon 206 of the interface 204. That is, the app 608 determines whether the user 114 has selected to straight travel path, a rightward turn, or a leftward turn.

At block 808, the app 608 identifies, via the touchscreen 202 of the mobile device 112, whether the user 114 is providing a continuous input motion along the track 208 of the interface 204. In response to the app 608 identifying that the user 114 is providing a continuous input motion along the track 208, the app 608 sends an instruction to the local control unit 116 of the vehicle 100 via the communication module 606 of the mobile device 112 and the communication module 110 of the vehicle 100. At block 810, the local control unit 116 performs motive functions of the vehicle 100 in the direction-of-travel identified by the user 114 via the icon 206 of the interface 204. In some examples, the local control unit 116 causes the vehicle 100 to travel at a speed that corresponds with a speed at which the user 114 is providing the continuous motion input along the track 208 of the interface 204. Upon completion of block 810, the method 800 returns to block 802. Otherwise, in response to the app 608 identifying, at block 808, that the user 114 is not providing a continuous input motion along the track 208, the method 800 proceeds to block 812.

At block 812, the app 608 determines whether the user 114 has not been providing a continuous input motion along the track 208 for at least a first predefined time threshold. In response to the app 608 determining that there has been no continuous input motion for less than the first predefined time threshold, the method 800 returns to block 804. For example, the method 800 returns to block 804 when the first predefined time threshold has not been met to create a grace period during which the app 608 assumes the user 114 has accidentally and momentarily stopped providing the continuous input motion. During the grace period, the app 608 of the mobile device 112 instructs the local control unit 116 to continue to perform motive functions of the vehicle 100. Otherwise, in response to the app 608 determining that there has been no continuous input motion for at least the first predefined time threshold, the app 608 sends a signal to the vehicle 100 to set the vehicle 100 in a stopped state. In the stopped state, the local control unit 116 prevents the vehicle 100 from performing any motive functions. That is, the vehicle 100 is stationary in the stopped state.

Further, while the vehicle 100 is in the stopped state, the method 800 proceeds to block 814 at which the app 608 determines whether the user 114 has not been providing a continuous input motion along the track 208 for at least a second predefined time threshold. For example, the second predefined time threshold exceeds the first predefined time threshold. In response to the app 608 determining that there has been no continuous input motion for at least the second predefined time threshold, the method 800 proceeds to block 816 at which the app 608 deactivates and/or a session of the app 608 ends on the mobile device 112.

Otherwise, in response to the app 608 determining that there has been no continuous input motion for less than the second predefined time threshold, the method 800 proceeds to block 818 at which one or more of the cameras 108 of the vehicle 100 captures image(s) and/or video of a surrounding area of the vehicle 100. At block 820, the communication module 110 of the vehicle 100 sends the captured image(s) and/or video to the mobile device 112. At block 822, the app 608 of the mobile device 112 presents the image(s) and/or video captured by the cameras 108 of the vehicle 100 when the vehicle 100 is in the stopped state. For example, the app 608 presents image(s) and/or video of the cameras 108 as a picture-in-picture within the interface 204 that enables the user 114 to control the motive functions of the vehicle 100. In some examples, the app 608 selects which captured video to present based on a location of the user 114 relative to the vehicle 100. For example, if the app 608 determines that the user 114 is on the left side of the vehicle 100, the app 608 presents video of the right side of the vehicle 100 to facilitate the user 114 in safely controlling the motive functions of the vehicle 100. Additionally, or alternatively, the app 608 (1) generates a bird's-eye view of the vehicle 100 created from the multiple image(s) and/or video captured by the cameras 108 and (2) presents the bird's-eye view of the vehicle 100 as a picture-in-picture within the interface 204. Upon completing block 822, the method 800 returns to block 804.

An example disclosed trailer maneuver-assist system includes a mobile device including a touchscreen to present an interface. The interface includes an icon for receiving a direction-of-travel and a track for receiving a continuous motion input. The example disclosed trailer maneuver-assist system also includes a vehicle. The vehicle includes a communication module for wireless communication with the mobile device and a local control unit that performs motive functions in the direction-of-travel while the mobile device receives the continuous motion input via the touchscreen.

In some examples, the interface is configured to receive the direction-of-travel and the continuous motion input simultaneously from a user.

In some examples, the icon includes a vehicle icon, a trailer icon, and a pin. The interface enables a user to position the pin relative to the vehicle icon and the trailer icon. In some such examples, the LCU drives the vehicle in a forward direction when the pin is positioned on the vehicle icon and in a reverse direction when the pin is positioned on the trailer icon. In some examples, the LCU turns the vehicle in a rightward direction when the pin is offset to the right and in a leftward direction when the pin is offset to the left.

An example disclosed remote trailer maneuver-assist system includes a vehicle that includes a hitch and a local control unit (LCU). The example disclosed remote trailer maneuver-assist system also includes a mobile app including an interface for a touchscreen of a mobile device. The interface includes an icon for receiving a direction-of-travel and a track for receiving a continuous motion input. The LCU performs motive functions in the direction-of-travel while the mobile app receives the continuous motion input via the touchscreen.

In some examples, the mobile app is configured to receive the direction-of-travel and the continuous motion input simultaneously from a user.

In some examples, the icon includes a vehicle icon, a trailer icon, and a pin. The mobile app enables a user to position the pin relative to the vehicle icon and the trailer icon. In some such examples, to position the pin, the mobile app enables the user to drag the pin and to tap a location for the pin. In some such examples, the LCU drives the vehicle in a forward direction when the pin is positioned on the vehicle icon and in a reverse direction when the pin is positioned on the trailer icon. In some such examples, the LCU turns the vehicle in a rightward direction when the pin is offset to the right and in a leftward direction when the pin is offset to the left. Further, in some such examples, the mobile app is configured instruct the LCU to continue to turn the vehicle while the user continues to hold the pin at an offset position on the interface and straighten out the vehicle in response to detecting that the user has released the pin on the interface. Further, in some such examples, the mobile app is configured to instruct the LCU to adjust a turning radius of the vehicle until the vehicle icon or the trailer icon reaches a position of the pin on the interface. In some examples, an angle between the vehicle icon and the trailer icon of the interface corresponds to an actual angle between the vehicle and a trailer hitched to the vehicle via the hitch. Further, in some such examples, the vehicle includes a hitch sensor to detect the actual angle between the vehicle and the trailer.

In some examples, the LCU causes the vehicle to travel at a vehicle speed that corresponds with a speed of the continuous motion input along the track of the interface.

In some examples, the mobile app prevents a user from changing a longitudinal direction of the direction-of-travel via the icon while the track is receiving the continuous motion input from the user. In some such examples, the mobile device provides at least one of a haptic feedback, an audio feedback, and a visual feedback to the user when the mobile app prevents the user from changing the longitudinal direction. In some examples, when the vehicle is moving, the LCU of the vehicle prevents a change in a longitudinal direction of the direction-of-travel of the vehicle. In some examples, the mobile app is configured to instruct the vehicle to change a longitudinal direction of the direction-of-travel in response to detecting an increased pressure applied to the touchscreen by a user.

In some examples, the vehicle includes an exterior camera. The interface of the mobile app includes a picture-in-picture of an image captured by the exterior camera when the vehicle is in a stopped state. In some such examples, the image captured by the exterior camera shows an opposing side of a surrounding area of the vehicle relative to a position of a user.

An example disclosed method includes receiving a direction-of-travel for a trailer maneuver-assist system from a user interacting with an icon of an interface presented by a mobile device, receiving a continuous motion input as the user interacts with a track of the interface, and communicating the direction-of-travel to a vehicle while the continuous motion input is received. The example disclosed method also includes performing, via a local control unit, vehicle motive functions in the direction-of-travel.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A trailer maneuver-assist system, comprising:
   a mobile device including a touchscreen to present an interface that includes:
   an icon for receiving a direction-of-travel associated with a vehicle attaching a trailer, wherein the icon includes a vehicle icon, a trailer icon, and a pin, wherein the interface enables a user to move the vehicle via positioning the pin relative to the vehicle icon and the trailer icon, wherein an angle between the vehicle icon and the trailer icon of the interface corresponds to an actual angle between the vehicle and the trailer hitched to the vehicle via a hitch; and
   a track for receiving a continuous motion input, wherein the interface enables the user to move the vehicle via continuously moving a finger or a stylus along the track; and the vehicle including:
   a communication module for wireless communication with the mobile device; and
   a local control unit (LCU) that performs motive functions in the direction-of-travel while the mobile device receives the continuous motion input via the touchscreen, wherein the LCU causes the vehicle to travel at a vehicle speed that corresponds with a speed of the continuous motion input along the track of the interface.

2. The trailer maneuver-assist system of claim 1, wherein the interface is configured to receive the direction-of-travel and the continuous motion input simultaneously from the user.

3. The trailer maneuver-assist system of claim 1, wherein the LCU drives the vehicle in a forward direction when the pin is positioned on the vehicle icon and in a reverse direction when the pin is positioned on the trailer icon.

4. The trailer maneuver-assist system of claim 1, wherein the LCU turns the vehicle in a rightward direction when the pin is offset to the right and in a leftward direction when the pin is offset to the left.

5. A remote trailer maneuver-assist system, comprising:
   a vehicle including:
   a hitch; and
   a local control unit (LCU); and
   a mobile app including an interface for a touchscreen of a mobile device, the interface including:
   an icon for receiving a direction-of-travel associated with the vehicle attaching to a trailer, wherein the icon includes a vehicle icon, a trailer icon, and a pin, wherein the interface enables a user to move the vehicle via positioning the pin relative to the vehicle icon and the trailer icon, wherein an angle between the vehicle icon and the trailer icon of the interface corresponds to an actual angle between the vehicle and the trailer hitched to the vehicle via the hitch; and
   a track for receiving a continuous motion input, wherein the interface enables the user to move the vehicle via continuously moving a finger or a stylus along the track,
   wherein the LCU performs motive functions in the direction-of-travel while the mobile app receives the continuous motion input via the touchscreen, and wherein the LCU causes the vehicle to travel at a vehicle speed that corresponds with a speed of the continuous motion input along the track of the interface.

6. The remote trailer maneuver-assist system of claim 5, wherein the mobile app is configured to receive the direction-of-travel and the continuous motion input simultaneously from the user.

7. The remote trailer maneuver-assist system of claim 5, wherein to position the pin, the mobile app enables the user to drag the pin and to tap a location for the pin.

8. The remote trailer maneuver-assist system of claim 5, wherein the LCU drives the vehicle in a forward direction when the pin is positioned on the vehicle icon and in a reverse direction when the pin is positioned on the trailer icon.

9. The remote trailer maneuver-assist system of claim 5, wherein the LCU turns the vehicle in a rightward direction when the pin is offset to the right and in a leftward direction when the pin is offset to the left.

10. The remote trailer maneuver-assist system of claim 9, wherein the mobile app is configured instruct the LCU to:
    continue to turn the vehicle while the user continues to hold the pin at an offset position on the interface; and
    straighten out the vehicle in response to detecting that the user has released the pin on the interface.

11. The remote trailer maneuver-assist system of claim 9, wherein the mobile app is configured to instruct the LCU to adjust a turning radius of the vehicle until the vehicle icon or the trailer icon reaches a position of the pin on the interface.

12. The remote trailer maneuver-assist system of claim 5, wherein the vehicle includes a hitch sensor to detect the actual angle between the vehicle and the trailer.

13. The remote trailer maneuver-assist system of claim 5, wherein the mobile app prevents the user from changing a longitudinal direction of the direction-of-travel via the icon while the track is receiving the continuous motion input from the user.

14. The remote trailer maneuver-assist system of claim 13, wherein the mobile device provides at least one of a haptic feedback, an audio feedback, and a visual feedback to the user when the mobile app prevents the user from changing the longitudinal direction.

15. The remote trailer maneuver-assist system of claim 5, wherein, when the vehicle is moving, the LCU of the vehicle prevents a change in a longitudinal direction of the direction-of-travel of the vehicle.

16. The remote trailer maneuver-assist system of claim 5, wherein the mobile app is configured to instruct the vehicle to change a longitudinal direction of the direction-of-travel in response to detecting an increased pressure applied to the touchscreen by the user.

17. The remote trailer maneuver-assist system of claim 5, wherein the vehicle includes an exterior camera, wherein the interface of the mobile app includes a picture-in-picture of an image captured by the exterior camera when the vehicle is in a stopped state.

18. The remote trailer maneuver-assist system of claim 17, wherein the image captured by the exterior camera shows an opposing side of a surrounding area of the vehicle relative to a position of the user.

19. A method comprising:
receiving a direction-of-travel associated with a vehicle attaching a trailer for a trailer maneuver-assist system from a user interacting with an icon of an interface presented by a mobile device, wherein the icon includes a vehicle icon, a trailer icon, and a pin, wherein the interface enables the user to move the vehicle via positioning the pin relative to the vehicle icon and the trailer icon, wherein an angle between the vehicle icon and the trailer icon of the interface corresponds to an actual angle between the vehicle and the trailer hitched to the vehicle via a hitch;
receiving a continuous motion input as the user interacts with a track of the interface, wherein the interface enables the user to move the vehicle via continuously moving a finger or a stylus along the track;
communicating the direction-of-travel to the vehicle while the continuous motion input is received;
performing, via a local control unit, vehicle motive functions in the direction-of-travel; and
causing, via the local control unit, the vehicle to travel at a vehicle speed that corresponds with a speed of the continuous motion input along the track of the interface.

* * * * *